US012791493B2

United States Patent

(12) United States Patent
Yahagi et al.

(10) Patent No.: US 12,791,493 B2
(45) Date of Patent: Nov. 10, 2026

(54) JUDGMENT APPARATUS

(71) Applicants: KABUSHIKI KAISHA TOSHIBA, Tokyo (JP); TOSHIBA DIGITAL SOLUTIONS CORPORATION, Kawasaki (JP)

(72) Inventors: Tomoyuki Yahagi, Tokyo (JP); Nobuyuki Matsumoto, Tokyo (JP); Kazutoshi Nagano, Yokohama Kanagawa (JP)

(73) Assignee: KABUSHIKI KAISHA TOSHIBA, Kawasaki (JP)

(*) Notice: Subject to any disclaimer, the term of this patent is extended or adjusted under 35 U.S.C. 154(b) by 443 days.

(21) Appl. No.: 18/551,284

(22) PCT Filed: Oct. 21, 2022

(86) PCT No.: PCT/JP2022/039227

§ 371 (c)(1),
(2) Date: Sep. 19, 2023

(87) PCT Pub. No.: WO2024/084675

PCT Pub. Date: Apr. 25, 2024

(65) Prior Publication Data

US 2025/0076211 A1 Mar. 6, 2025

(51) Int. Cl.

*G06K 9/00* (2022.01)
*G01N 21/88* (2006.01)

(Continued)

(52) U.S. Cl.

CPC ......... *G01N 21/8851* (2013.01); *G01N 21/93* (2013.01); *G06T 7/0006* (2013.01); *G06V 10/60* (2022.01)

(58) Field of Classification Search

CPC ................ G01N 21/885; G01N 21/93; G01N 2021/8887; G01N 2021/8854;

(Continued)

(56) References Cited

U.S. PATENT DOCUMENTS 11,042,977 B2 * 6/2021 Kurihara ............ G06V 10/7788
12,151,754 B2 * 11/2024 Takahashi .............. G01N 21/84

(Continued)

FOREIGN PATENT DOCUMENTS

JP S63-225111 A 9/1988
JP H4-353452 A 12/1992

(Continued)

OTHER PUBLICATIONS

International Search Report for PCT/JP2022/039227 Dated Oct. 21, 2022.

(Continued)

*Primary Examiner* — Shervin K Nakhjavan

(74) *Attorney, Agent, or Firm* — Finnegan, Henderson, Farabow, Garrett & Dunner, LLP

(57) ABSTRACT

To provide a judgment apparatus capable of achieving improved judgment accuracy, a judgment apparatus according to an embodiment judges a judgment target as pass or fail based on pass judgment characteristic information produced using characteristic amounts extracted from previously collected monitoring data items of judgment targets judged as pass. The pass/fail judgment processing includes extracting the characteristic amounts from monitoring data items of judgment targets sequentially input and successively performing pass/fail judgment of the judgment targets based on the pass judgment characteristic information. When one of the judgment targets is judged as pass in the successive pass/fail judgment, the characteristic amount of the judgment target judged as pass is used to update the pass (Continued)

judgment characteristic information. Pass/fail judgment of a judgment target subsequent to the judgment target judged as pass is performed based on the updated pass judgment characteristic information.

6 Claims, 4 Drawing Sheets

(51) Int. Cl.

| | |
|---|---|
| ***G01N 21/93*** | (2006.01) |
| ***G06T 7/00*** | (2017.01) |
| ***G06V 10/60*** | (2022.01) |

(58) Field of Classification Search

CPC . G01N 2201/1042; G06T 7/0006; G06T 7/00; G06T 7/001; G06V 10/60; G05B 2219/32201; G05B 19/41875

See application file for complete search history.

(56) References Cited

U.S. PATENT DOCUMENTS

| | | | | |
|---|---|---|---|---|
| 2014/0119634 | A1 | 5/2014 | Numazu | |
| 2019/0035066 | A1 | 1/2019 | Bae et al. | |
| 2019/0094155 | A1 | 3/2019 | Honda et al. | |
| 2020/0057003 | A1 | 2/2020 | Honda et al. | |
| 2021/0266422 | A1 | 8/2021 | Kikuta et al. | |
| 2021/0385413 | A1* | 12/2021 | Wen | G06T 7/001 |
| 2023/0005120 | A1* | 1/2023 | Kondo | G06T 7/001 |
| 2023/0058809 | A1* | 2/2023 | Kim | G06T 7/11 |
| 2023/0351582 | A1* | 11/2023 | Taylor | G06T 7/136 |
| 2024/0221343 | A1* | 7/2024 | Ikeda | G01N 23/18 |

FOREIGN PATENT DOCUMENTS

| | | | | | |
|---|---|---|---|---|---|
| JP | H05-332740 | A | | 12/1993 | |
| JP | H6-143287 | A | | 5/1994 | |
| JP | H10-308939 | A | | 11/1998 | |
| JP | 2005265661 | A | * | 9/2005 | G01N 21/93 |
| JP | 2007-309729 | A | | 11/2007 | |
| JP | 2008-286541 | A | | 11/2008 | |
| JP | 2013-224833 | A | | 10/2013 | |
| JP | 2020500308 | A | * | 1/2020 | G01N 21/88 |
| JP | 2021-014100 | A | | 2/2021 | |
| JP | 2022-065961 | A | | 4/2022 | |
| KR | 10-2018-0102117 | A | | 9/2018 | |
| WO | WO 2012/172695 | A1 | | 12/2012 | |

OTHER PUBLICATIONS

European Patent Office, Extended European Seach Report in EP App. No. 22927621.7, 10 pages (Oct. 21, 2024).

Korean Patent Office, Office Action in KR App. No. 10-2023-7028262, (Sep. 10, 2025).

Korean Patent Office, Written Decision on Registration in KR App. No. 10-2023-7028262, (Jul. 14, 2026).

* cited by examiner

【FIG. 1】
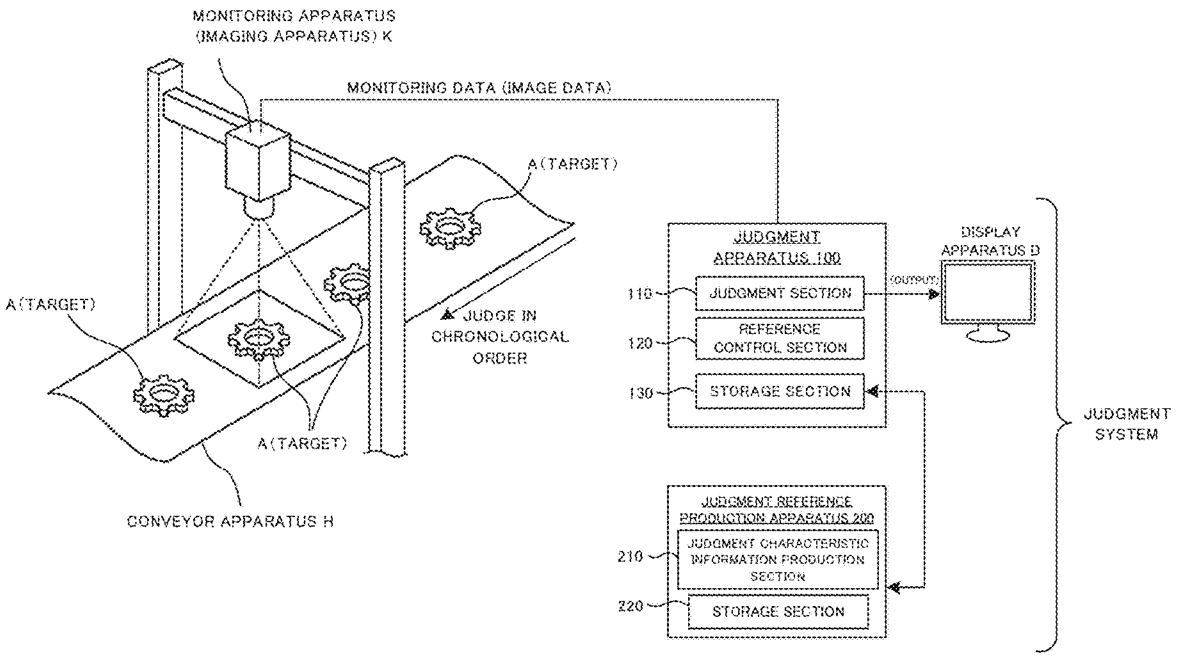
【FIG. 2】
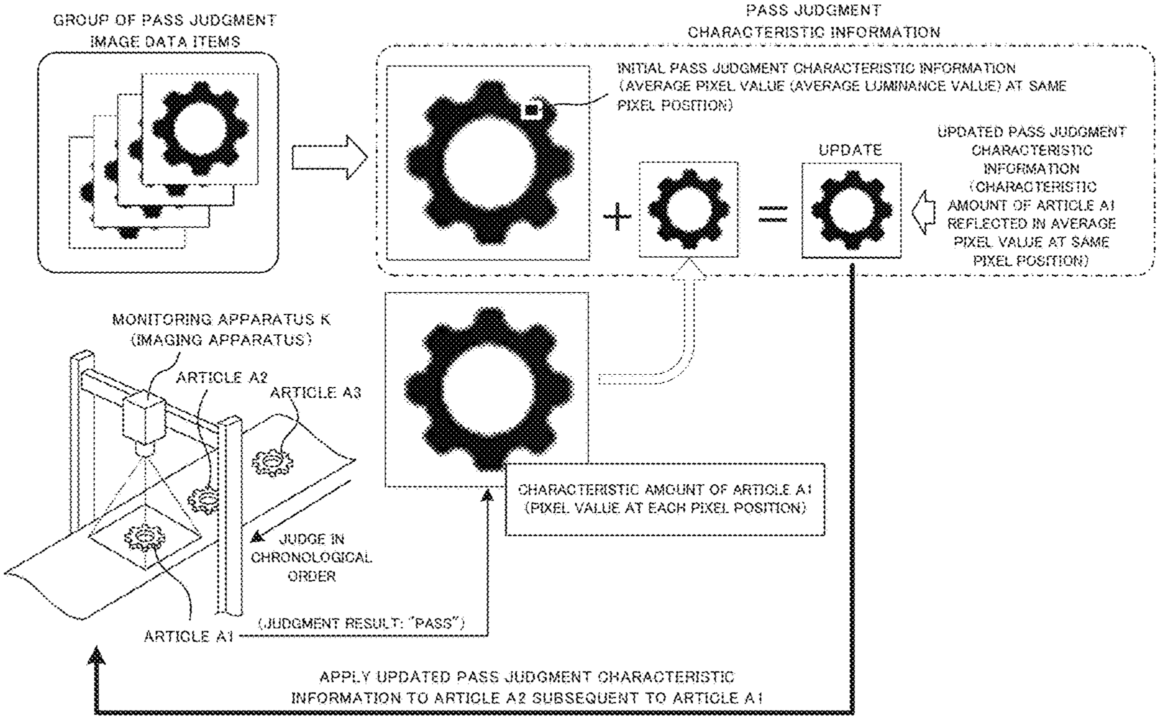

【FIG. 3】
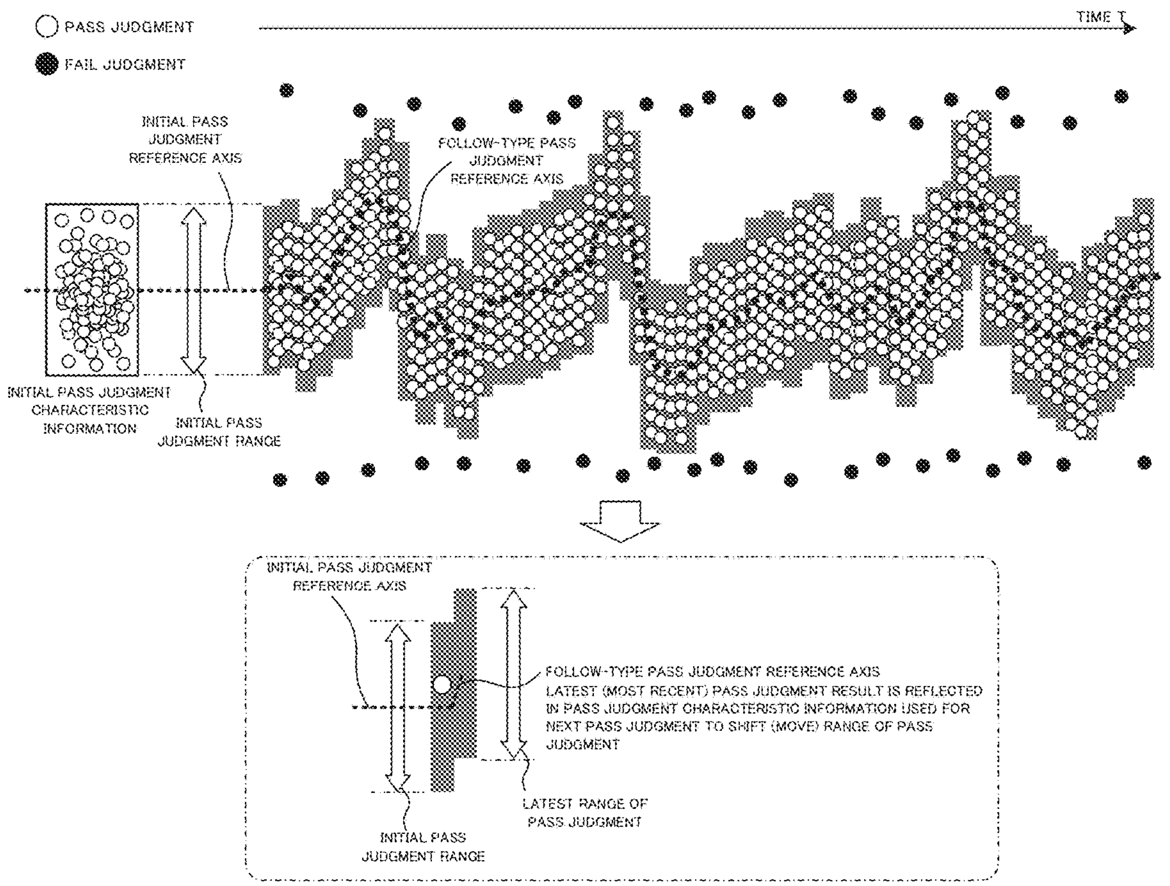
【FIG. 4】
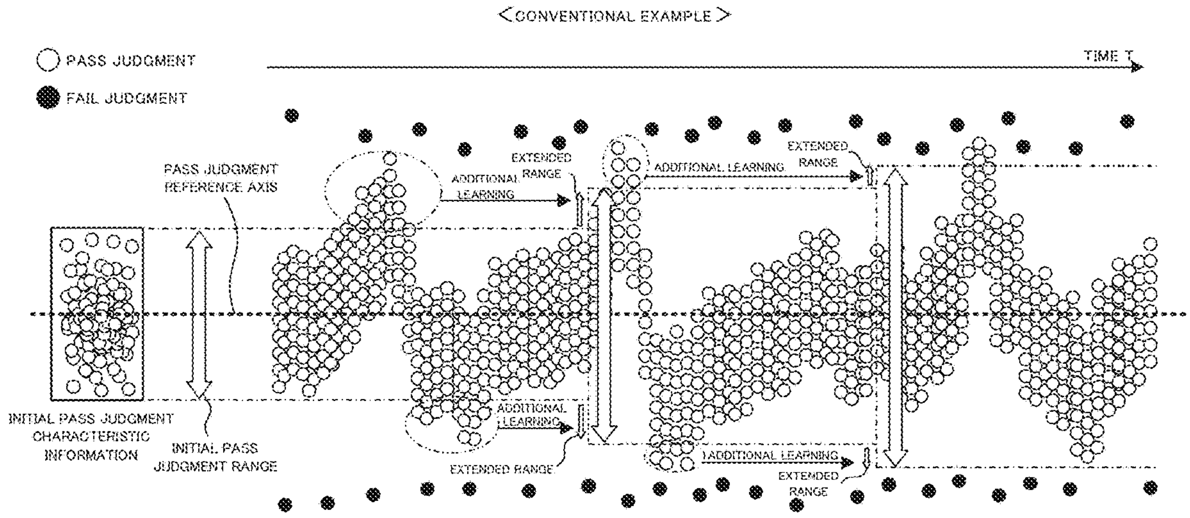

【FIG. 5】
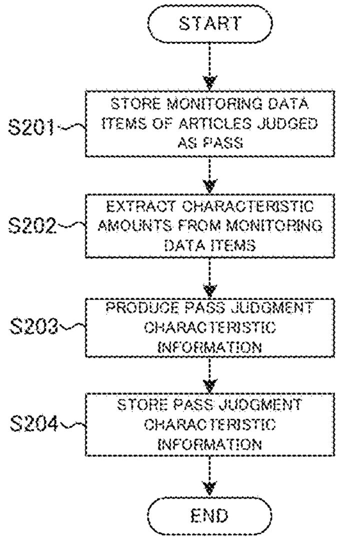
【FIG. 6】
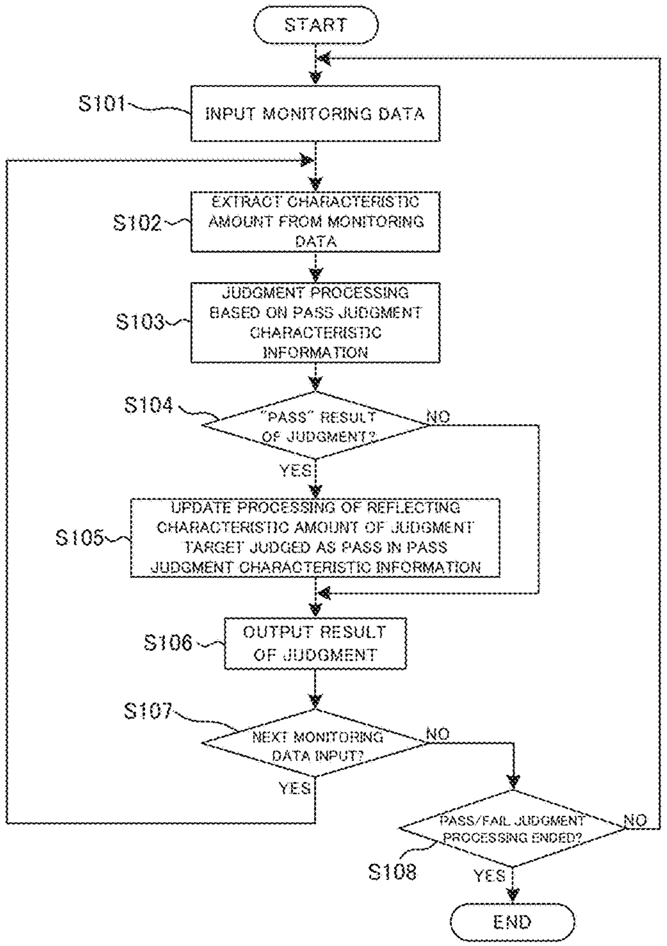

【FIG. 7】
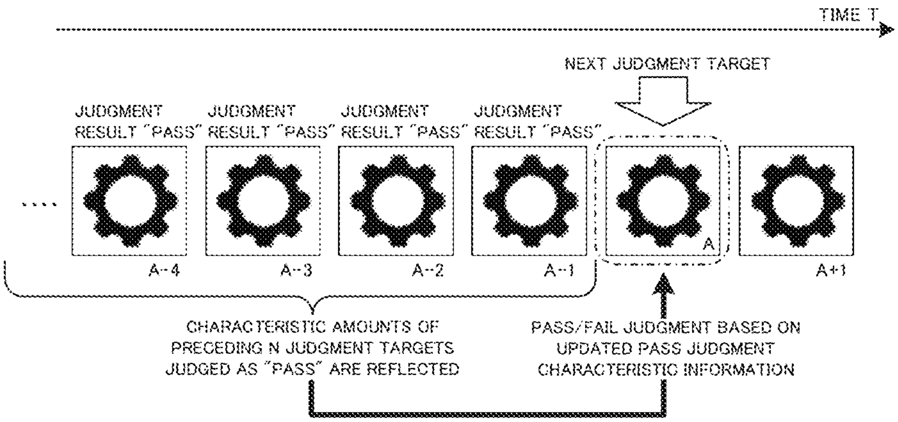
【FIG. 8】
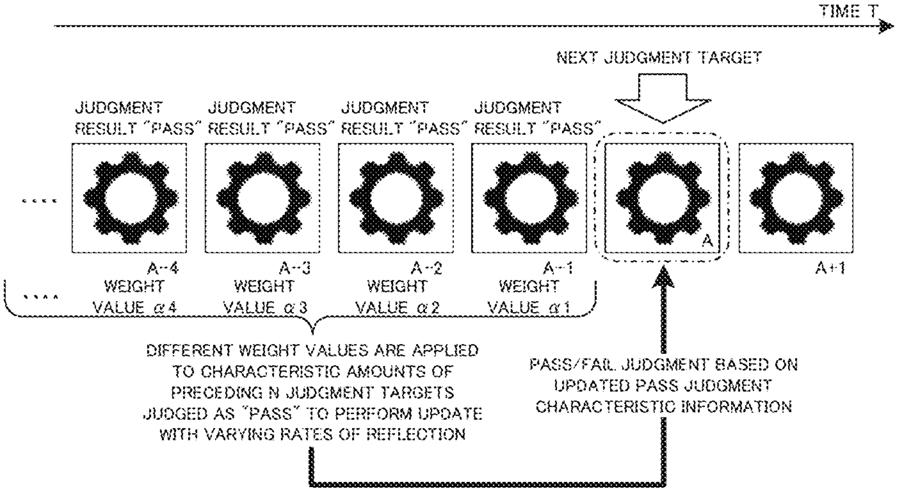

JUDGMENT APPARATUS

TECHNICAL FIELD

Embodiments of the present invention relate to a technique for pass/fail judgment of a judgment target.

BACKGROUND ART

An exemplary technique for pass/fail judgment of a judgment target involves taking images of articles and judging pass/fail of the article taken in each image.

PRIOR ART DOCUMENTS

Patent Documents

[Patent Document 1] Japanese Patent Laid-Open No. 2013-224833

[Patent Document 2] Japanese Patent Laid-Open No. 2022-65961

DISCLOSURE OF THE INVENTION

Problems to be Solved by the Invention

It is an object of the present invention to provide a judgment apparatus capable of achieving improved judgment accuracy.

Means for Solving the Problems

A judgment apparatus according to embodiments judges a judgment target as pass or fail using a monitoring data item of the judgment target. The judgment apparatus includes a storage section configured to store pass judgment characteristic information produced using characteristic amounts extracted from previously collected monitoring data items of judgment targets judged as pass; a judgment section configured to extract the characteristic amounts from monitoring data items of judgment targets sequentially input and to successively perform pass/fail judgment of the judgment targets based on the pass judgment characteristic information; and a reference control section configured to, when one of the judgment targets is judged as pass in the successive pass/fail judgment, use the characteristic amount of the judgment target judged as pass to update the pass judgment characteristic information. The judgment section is configured to perform pass/fail judgment of a judgment target subsequent to the judgment target judged as pass based on the updated pass judgment characteristic information.

BRIEF DESCRIPTION OF THE DRAWINGS

FIG. 1 A block diagram showing the functions of a judgment system including a judgment apparatus according to Embodiment 1.

FIG. 2 An explanatory diagram for pass/fail judgment processing with reference to image data taken from judgment targets according to Embodiment 1.

FIG. 3 An explanatory diagram for pass/fail judgment processing to which a pass/fail judgment function is applied according to Embodiment 1.

FIG. 4 An explanatory diagram for conventional pass/fail judgment processing.

FIG. 5 A diagram showing a flow of processing for producing pass judgment characteristic information according to Embodiment 1.

FIG. 6 A diagram showing a flow of pass/fail judgment processing including processing of updating the pass judgment characteristic information according to Embodiment 1.

FIG. 7 A diagram for illustrating a first variation of the processing of updating the pass judgment characteristic information according to Embodiment 1.

FIG. 8 A diagram for illustrating a second variation of the processing of updating the pass judgment characteristic information according to Embodiment 1.

MODE FOR CARRYING OUT THE INVENTION

An embodiment of the present invention is hereinafter described with reference to the accompanying drawings.

Embodiment 1

FIGS. 1 to 8 are diagrams for illustrating a judgment system according to Embodiment 1.

FIG. 1 is a block diagram showing the functions of the judgment system including a judgment apparatus 100 according to Embodiment 1. The judgment system includes the judgment apparatus 100 and a judgment reference production apparatus 200. The judgment apparatus 100 performs pass/fail judgment of a judgment target.

The judgment system according to Embodiment 1 can be used, for example, in an appearance test of articles. In this case, a monitoring apparatus K corresponds to an imaging apparatus for taking images of articles, and monitoring data corresponds to taken image data. The judgment system according to Embodiment 1 is hereinafter described with reference to the appearance test of articles as an example.

The imaging apparatus K takes images of articles A to be tested (which correspond to judgment targets) and outputs the image data to the judgment apparatus 100. The judgment apparatus 100 saves the received image data in a storage apparatus 130. The imaging apparatus K can acquire and output still images or moving images of the articles A to the judgment apparatus 100. When moving images are taken, still images are cut out of the moving images and used as image data of the article A. The orientation of the article A is set as appropriate to provide image data suitable for the test. For example, multiple articles A are carried sequentially by a conveyor apparatus H. The imaging apparatus K is fixed and sequentially takes images of the carried articles A. The image data of the articles is sequentially input to the judgment apparatus 100.

The judgment apparatus 100 is configured to perform the pass/fail judgment successively by sequentially judging pass/fail of different articles carried successively in chronological order. The results of pass/fail judgments of the judgment apparatus 100 are output to a display apparatus D.

The judgment apparatus 100 includes a judgment section 110, a reference control section 120, and the storage section 130. The judgment reference production apparatus 200 includes a judgment characteristic information production section 210 and a storage section 220.

FIG. 2 is an explanatory diagram for pass/fail judgment processing with reference to image data taken from judgment targets. In Embodiment 1, pass/fail of each article A is judged based on pass judgment characteristic information. As shown in FIG. 2, the image data items of the articles A judged as pass are selected from the previously collected image data items of the articles A, characteristic amounts are extracted from the selected image data items, and pass judgment characteristic information is produced based on the extracted characteristic amounts. The image data items of the articles judged as fail are not used.

By way of example, as shown in FIG. 2, an average pixel value (average luminance value) is calculated at the same pixel position in the image data items of the articles judged as pass. Specifically, the pixel value at each pixel position in the image data serves as the characteristic amount (characteristic information), and the pass judgment characteristic information is configured to include the average pixel value (average luminance value) at each pixel position.

Then, a range is defined relative to the average pixel value such that a judgment target can be judged as pass only within the range. For example, the range is defined at each pixel position from the average pixel value+a predetermined value (a first threshold)×1 to the average pixel value−a predetermined value (a second threshold)×2. In other words, the upper limit and the lower limit are set based on the average pixel value at each pixel position. It should be noted that the predetermined value×1 and the predetermined value×2 may be different values at each pixel position or the same value at different pixel positions.

The predetermined value×1 and the predetermined value×2 can be specified based on the range of distribution (variance or deviation) of pixel values in the image data items of the articles judged as pass. The pass/fail judgment processing includes determining whether the pixel value (characteristic amount) at each pixel position in the image data of the article A corresponding to a judgment target falls within the pass judgment range defined by the first threshold and the second threshold (whether it is below the upper limit or above the lower limit), and the result of the pass/fail judgment is output.

By way of example, the pass judgment characteristic information according to Embodiment 1 is statistic information (statistic pass judgment characteristic information) specified at each pixel position by the average pixel value in the image data items of the articles judged as pass and the range of distribution of pixel values around the average pixel value in the image data items of the articles judged as pass.

The processing of producing the pass judgment characteristic information is performed by the judgment reference production apparatus 200 (judgment characteristic information production section 210), and the multiple image data items for use in producing the pass judgment characteristic information are saved in the storage section 220. The pass judgment characteristic information produced by the judgment reference production apparatus 200 is provided as initial pass judgment characteristic information to the judgment apparatus 100 and stored in the storage apparatus 130.

Multiple articles A1, A2, and A3 sequentially transferred from upstream to downstream on the conveyor apparatus H are shot by the imaging apparatus K, and for each image data item provided sequentially from the imaging apparatus K, pass judgment processing is performed. The judgment section 110 of the judgment apparatus 100 extracts the characteristic amount from the image data of the first article A1. The characteristic amount is the pixel value (luminance value) at each pixel position in the image data. The judgment section 110 compares the characteristic amount extracted from the image data with the pass judgment characteristic information to perform pass/fail judgment. For example, the judgment section 110 performs the pass/fail judgment processing by determining whether the pixel data at each pixel position in the image data falls within the range of the pass judgment characteristic information.

The judgment apparatus 100 stores the result of pass/fail judgment of the article A1 as a log in the storage section 130 and outputs the result to the display apparatus D. The display apparatus D displays the result of pass/fail judgment output from the judgment apparatus 100 to allow a user to visually recognize the result.

Next, judgment processing of the subsequent article A2 is performed. In Embodiment 1, when the preceding article A1 has the pass/fail judgment result "pass," the initial pass judgment characteristic information used for the article A1 is not used in the pass/fail judgment processing of the article A2 but updated pass judgment characteristic information is used in which the characteristic amount of the article A1 judged as pass is reflected in the initial pass judgment characteristic information.

For example, the judgment apparatus 100 calculates, at each pixel position, the average value between the pixel value in the image data of the article A1 and the average pixel value of the initial pass judgment characteristic information, and performs update to pass judgment characteristic information having the calculated average pixel value at each pixel position (pass judgment characteristic information taking account of the characteristic amount of the article A1). Specifically, the processing of updating the pass judgment characteristic information is performed by the reference control section 120, and the updated pass judgment characteristic information is stored in the storage apparatus 130.

The judgment section 110 extracts the characteristic amount from the image data of the article A2 and reads the updated pass judgment characteristic information from the storage apparatus 130 to perform pass/fail judgment processing. When the result of pass/fail judgment of the article A2 is "pass," the reference control section 120 calculates the average value between the pixel value in the image data of the article A2 and the average pixel value of the updated pass judgment characteristic information and performs update to pass judgment characteristic information taking account of the characteristic amount of the article A2. The pass judgment characteristic information at this point is pass judgment characteristic information taking account of the characteristic amounts of both the article A1 and article A2 and is used later in pass/fail judgment processing of the article A3.

It should be noted that the predetermined value×1 and the predetermined value×2 specified in the initial pass judgment characteristic information as part of the pass judgment characteristic information can be used without any change before and after the update. Alternatively, after the average pixel value is calculated based on the characteristic amount of the article judged as pass, the predetermined value×1 and the predetermined value×2 may be changed in accordance with the amount of change in the resulting average pixel value.

As described above, the judgment apparatus 100 extracts the characteristic amount from each of the sequentially input image data items of the articles and successively performs the pass/fail judgment of the multiple articles based on the pass judgment characteristic information. The judgment apparatus 100 includes the reference control section 120. When the article A1 is judged as pass during the sequentially performed pass/fail judgment, the reference control section 120 uses the characteristic amount of the article A1 judged as pass to update the pass judgment characteristic information serving as the judgment reference. The pass/fail judgment of the next article A2 carried on the conveyor apparatus H is controlled to be performed based on the updated pass judgment characteristic information (the pass judgment characteristic information different from the pass judgment characteristic information used in the preceding pass/fail judgment).

In other words, the article to be judged as pass or fail undergoes pass/fail judgment processing based on the pass judgment characteristic information updated in accordance with the characteristic amount of the article previously judged as pass.

As described above, the processing of updating the pass judgment characteristic information is controlled such that the characteristic amount of the article having the pass/fail judgment result "pass" is reflected but the characteristic amount of the article having the pass/fail judgment result "fail" is not reflected. For example, when the result of pass/fail judgment of the article A2 is "fail," the processing of updating the pass judgment characteristic information is not performed, and the processing of pass/fail judgment of the article A3 is performed by using the updated pass judgment characteristic information only taking account of the characteristic amount of the article A1. Thus, when the sequentially performed pass/fail judgment processing provide "fail" results over some successive pass/fail judgments, the pass judgment characteristic information is not updated or changed during those "fail" judgments.

In contrast, when the pass/fail judgment processing provides a pass/fail judgment result "pass," the pass judgment characteristic information is updated and changed as needed. FIG. 3 is an explanatory diagram for pass/fail judgment processing to which the pass/fail judgment function is applied according to Embodiment 1. FIG. 4 is an explanatory diagram for conventional pass/fail judgment processing.

In FIG. 3, the initial pass judgment characteristic information consists of a group of judgment targets judged as pass shown by white circles. The pass judgment characteristic information has a range of pass judgment defined as described above (the range of characteristic amounts in image data within which pass judgment is possible). For example, in the example of FIG. 3, the average value of the pass judgment characteristic information serves as a reference axis for pass judgment, and the range within which pass judgment is possible is set relative to the reference axis (predetermined value×1, ×2).

The pass judgment characteristic information can be represented as the range of characteristic amounts having a predetermined width with the average value serving as the reference axis. In Embodiment 1, the reference axis of the pass judgment characteristic information is shifted in real time by the processing of updating the pass judgment characteristic information. In FIG. 3, the pass judgment characteristic information is represented as gray-colored rectangular blocks. It should be noted that, while one rectangular block is shown to include multiple judgment targets judged as pass (white circles), this represents simplified judgment targets judged as pass included in that rectangular block.

As shown in FIG. 3, when the result of pass/fail judgment of a judgment target is "pass" and the characteristic amount of the judgment target has a value above the reference axis (average value), the updated pass judgment characteristic information has a range of pass judgment with its reference axis shifted upward. In contrast, when the characteristic amount of the judgment target has a value below the reference axis, the updated pass judgment characteristic information has a range of pass judgment with its reference information shifted downward. In this manner, the pass judgment characteristic information is updated in accordance with the characteristic amount of the preceding judgment target, and the reference axis is changed in real time as shown by a bold dotted line. The pass judgment characteristic information (range of pass judgment) is shifted by following the characteristic amount of the judgment target judged as pass and is used in the next pass judgment processing.

In contrast, the conventional example shown in FIG. 4 represents an approach in which the range of pass judgment characteristic information is extended. The conventional approach includes performing pass/fail judgment for a certain period based on initial pass judgment characteristic information and extracting any judgment target which falls outside the range of the initial pass judgment characteristic information during that period and thus is judged as "fail" in the pass/fail judgment but actually falls within the range of pass judgment, that is, any false-positive judgment target.

The initial pass judgment characteristic information is updated such that the false-positive judgment target is judged as pass, and based on the updated pass judgment characteristic information, pass/fail judgment is performed for a certain period. Then, the steps of extracting any false-positive judgment target during that period and updating the pass judgment characteristic information are repeated.

The conventional approach has two disadvantages. One of them is a large number of false-positives in response to environmental changes which may occur during a certain period for which the pass/fail judgment processing is performed based on the same pass judgment characteristic information. For example, when the condition of lighting of the judgment target is changed with the seasons or due to the degradation of equipment over time, inconsistent characteristic amounts are extracted from image data of judgment targets which should be judged as pass. This susceptibility to the environmental changes during the pass/fail judgment processing (during the test) leads to the disadvantage of many false-positives in response to the environmental changes, resulting in reduced judgment accuracy.

The second disadvantage is described as follows. The pass judgment characteristic information is updated based on the characteristic amount of the monitoring data of the false-positive judgment target. As shown in FIG. 4, however, the reference axis of the updated pass judgment characteristic information is the same as the reference axis of the pass judgment characteristic information before update, and the range of pass judgment is extended such that the false-positive judgment target is judged as pass. In other words, the reference axis of pass judgment is not changed but the same reference axis is used after update, and the range of pass judgment is extended. This results in the disadvantage of increased false-negatives.

The tradeoff between false-positive and false-negative is a problem inevitably involved in an attempt to improve the accuracy of pass/fail judgment, as conventionally known. The false-positive is erroneous judgment of a non-defective article as a defective article. The above conventional approach can reduce the false-positives by extending the range of pass judgment. In other words, however, a larger range of pass judgment means more judgments as pass, thereby increasing false-negatives. The false-negative is erroneous judgment of a defective article as a non-defective article. Narrowing the range of pass judgment results in more false-positives, whereas widening the range of pass judgment causes more false-negatives. In this manner, they have an inverse relationship.

The judgment apparatus 100 according to Embodiment 1 sequentially performs the pass/fail judgment processing in chronological order, and when the result of pass/fail judgment of a judgment target is "pass," performs update by reflecting the characteristic amount of that judgment target in the pass judgment characteristic information, and uses the updated pass judgment characteristic information for the subsequent judgment target. For example, when the weather gets better and the sun shines to change the illuminance of judgment targets under test, this environmental change is reflected in the characteristic amount of the judgment target judged as pass. Thus, the subsequent judgment target can undergo pass/fail judgment based on the updated pass judgment characteristic information in response to the environmental change to reduce false-positives due to the environmental change.

FIG. 5 is a diagram showing a flow of processing for producing the pass judgment characteristic information according to Embodiment 1. FIG. 6 is a diagram showing a flow of pass/fail judgment processing including the processing of updating the pass judgment characteristic information.

As shown in FIG. 5, the storage section 220 of the judgment reference production apparatus 200 stores the monitoring data items of judgment targets judged as pass selected from the previously collected monitoring data items of multiple judgment targets (S201). The judgment characteristic information production section 210 extracts the characteristic amounts (for example, luminance values at each pixel position in image data items) required for pass/fail judgment of judgment targets from the monitoring data items (S202). The judgment characteristic information production section 210 calculates the average value of the extracted characteristic amounts and produces pass judgment characteristic information centered on the average value of the characteristic amounts (S203). The pass judgment characteristic information can be set to have a range relative to the average value within which pass judgment is possible. For example, the judgment characteristic information production section 210 can calculate a predetermined value (threshold value) based on the range of distribution of monitoring data items of the judgment targets judged as pass and use the calculated predetermined value to produce the pass judgment characteristic information such that the range of pass judgment is defined by the average pixel value+the predetermined value×1 and the average pixel value−the predetermined value×2. The judgment characteristic information production section 210 stores the produced pass judgment characteristic information as initial pass judgment characteristic information in the storage section 220 (S204). The initial pass judgment characteristic information is provided for the judgment apparatus 100 at any time.

The processing of pass/fail judgment according to Embodiment 1 is sequential processing in chronological order for multiple judgment targets (see FIG. 2). As shown in FIG. 6, the judgment apparatus 100 receives input of monitoring data, and in response to the input of the monitoring data, performs pass/fail judgment processing.

The judgment apparatus 100 extracts the characteristic amount from the input monitoring data (S102), and performs pass/fail judgment by comparing pass judgment characteristic information (initial pass judgment characteristic information) with the characteristic amount of the judgment target (S103). When the result of pass/fail judgment is "pass" (YES at S104), the judgment apparatus 100 performs the processing of updating the pass judgment characteristic information (S105). When the result of pass/fail judgment is "fail," the judgment apparatus 100 does not perform the processing of updating the pass judgment characteristic information. The judgment apparatus 100 outputs the result of pass/fail judgment to the display apparatus D (S106). The result of pass/fail judgment may be stored as a log in the storage apparatus 130.

The judgment apparatus 100 according to Embodiment 1 determines whether the monitoring data of the subsequent judgment target is input (S107), and when the next monitoring data is input (YES at S107), returns to step S102 to perform the pass/fail judgment processing (S103). When the result of the preceding pass/fail judgment is "pass," the pass judgment characteristic information has been updated, so that the judgment apparatus 100 performs the pass/fail judgment processing based on the updated pass judgment characteristic information at step S103.

When it is determined that there is no input of the next monitoring data (NO at step S107), the judgment apparatus 100 checks the presence or absence of an instruction to end the pass/fail judgment processing, and when such an instruction is present (YES at S108), ends the pass/fail judgment processing, or when such an instruction is absent (NO at S108), waits until the next monitoring data is input.

When the pass/fail judgment processing is restarted after the pass/fail judgment processing is once ended, the pass judgment characteristic information may be reset and the initial pass judgment characteristic information may be used, or the pass judgment characteristic information updated last in the previous pass/fail judgment processing (the latest updated pass judgment characteristic information) may be used.

In the appearance test of articles using image data, the image data input to the judgment apparatus 100 can undergo various types of image processing before comparison with the pass judgment characteristic information. For example, the image data can undergo smoothing processing (with a median filter or an average value filter) for noise removal, and then the pixel value can be extracted at each pixel position to extract the characteristic amount of the image data. When the monitoring data is image data, the pass judgment characteristic information is "statistic pass judgment characteristic information" based on the characteristic amounts of the image data items judged as pass. Thus, the predetermined image processing described above is performed similarly in producing the pass judgment characteristic information, and the comparison between that information and the characteristic amount is made with the same image processing subjected to them.

Variations of the pass/fail judgment processing described above are now described.

The pass/fail judgment processing described above can be subdivided when the characteristic amount of a judgment target falls within the range of pass judgment characteristic information and thus the result of judgment is "pass." For example, the pass/fail judgment processing can be configured in two levels in which it is determined whether any abnormality is present in the judgment target, and when any abnormality is present, it is determined whether the abnormality is out of a predetermined acceptable range.

In this case, the pass judgment characteristic information can include first pass judgment characteristic amount information for determining the presence or absence of any abnormality in a judgment target and second pass judgment characteristic information for determining whether the abnormality falls within the predetermined acceptable range. The judgment reference production apparatus 200 produces the first pass judgment characteristic amount information and the second pass judgment characteristic amount information from the characteristic amounts of the judgment targets judged as pass.

Description is now made with the appearance test of articles described above as an example. First, the pixel values at each pixel position in image data items are checked to determine whether there is any pixel beyond a threshold value (first determination processing). The pass judgment characteristic information used in this determination corresponds to the first pass judgment characteristic information, and is specified as described above by the average pixel value+the predetermined value (the first threshold)×1 and the average pixel value−the predetermined value (the second threshold)×2 at each pixel position in the group of image data items judged as pass described above.

Next, when it is determined that there is any pixel beyond the threshold value, that is, when it is determined that there is any abnormality in the judgment target, then it is determined whether the abnormality falls within the predetermined acceptable range (second determination processing). The pass judgment characteristic information used in this determination corresponds to the second pass judgment characteristic information. For example, the judgment section 110 compares the multiple pixel values in the image data items with the first pass judgment characteristic information in the first pass/fail judgment processing and extracts any abnormal pixel deviating from the threshold, which can find a group of extracted abnormal pixels, that is, an abnormal region.

Then, the second judgment processing for determining whether the abnormal region found in the first pass/fail judgment processing falls within the range judged as pass is performed by using the characteristics of the abnormal region, for example, the area of the abnormal region, the shape of the abnormal region, and the distribution of pixel values in the abnormal region. The information about the characteristics of the abnormal region corresponds to the second pass judgment characteristic information. For example, when the area is used as the characteristic of the abnormal region, the threshold value of the area is preset. The area is represented by the number of pixels included in the abnormal region. The judgment apparatus 100 judges the article A as “pass” when the area of the abnormal area is less than the threshold value or judges the article A as “fail” when the area is greater than the threshold value.

For the shape, an aspect ratio is used, by way of example. The aspect ratio is the ratio of the length in a long-axis direction to the length in a short-axis direction. The long-axis direction is a direction in parallel to the longest one of line segments connecting any two points on the outer edge of a particle. The short-axis direction is perpendicular to the long-axis direction. When the shape is used as the characteristic of the abnormal region, the threshold value of the aspect ratio is preset. The magnitude relationship between the aspect ratio and the threshold value is set depending on articles. For example, when low-quality articles under test tend to include an abnormal region having a larger aspect ratio, the judgment apparatus 100 judges the article as “fail” when the aspect ratio is greater than the threshold value, or judges the article as “pass” when the aspect ratio is equal to or lower than the threshold value.

For the distribution, it is possible to use the ratio of the number of pixels below the lower limit threshold to the number of pixels included in the abnormal region, or the ratio of the number of pixels above the upper limit threshold to the number of pixels included in the abnormal region, by way of example. When the distribution is used as the characteristic of the abnormal region, the threshold values of these ratios are set. For example, the judgment apparatus 100 judges the article as “pass” when these ratios are not beyond the respective threshold values, or judges the article as “fail” when either one of these ratios is beyond the associated threshold value.

The judgment section 110 judges the article as “pass” when it is determined that no abnormality is present in the first judgment processing at step S103 in FIG. 6 or when the condition of the second pass judgment characteristic information is satisfied in the second judgment processing even when it is determined that any abnormality is present in the first judgment processing.

When the judgment target is judged as pass in the pass/fail judgment including the successively performed first judgment processing and second judgment processing, the reference control section 120 uses the characteristic amount of the judgment target judged as pass to update at least the first pass judgment characteristic information at step S105 in FIG. 6 and can perform control to use the updated first pass judgment characteristic information and the second pass judgment characteristic information in pass/fail judgment of the next judgment target.

FIG. 7 is a diagram for illustrating a first variation of the processing of updating the pass judgment characteristic information. As shown in FIG. 7, the first variation updates the pass judgment characteristic information by taking account of the characteristic amounts of not only the preceding judgment target A-1 judged as pass but also the judgment targets A-2, A-3, A-4, . . . A-N judged as pass before the judgment target A-1. Any number of judgment targets previously judged as pass can be taken into account. Alternatively, time information may be used, for example. In this case, a pass/fail judgment result “pass” may trigger extraction of the characteristic amounts of judgment targets previously judged as pass within a predetermined time period (several tens of seconds, several minutes or the like) before that judgment to update the pass judgment characteristic information.

For update of the pass judgment characteristic information by taking account of the characteristic amounts of the previous N judgment targets, the characteristic amount of any judgment target judged as “fail” present in those judgment targets is not taken into account (excluded) and only the characteristic amounts of the judgment targets judged as “pass” are included.

As described above, in the first variation, when the judgment target A-1 is judged as pass in the sequentially performed pass/fail judgment, the reference control section 120 adds the characteristic amounts of the judgment targets A-2, A-3, A-4, . . . and A-N judged as pass before the judgment target A-1 judged as pass to the pass judgment characteristic information used in that pass/fail judgment and calculate the average to update the pass judgment characteristic information. The judgment section 110 can perform pass/fail judgment of the subsequent judgment target A based on the updated pass judgment characteristic information having the average value shifted by the characteristic amounts of the judgment targets A-1, A-2, A-3, A-4, . . . A-N previously judged as pass.

FIG. 8 is a diagram for illustrating a second variation of the processing of updating the pass judgment characteristic information. The second variation is an aspect in which a weight value is applied to the first variation.

As shown in FIG. 8, the reference control section 120 can apply weight values $\alpha 1$, $\alpha 2$, $\alpha 3$, $\alpha 4$, . . . $\alpha n$ to the characteristic amounts of the judgment targets A-1, A-2, A-3, A-4, . . . A-N-judged as pass, respectively, before the judgment target A-1 judged as pass, and add and average the characteristic amounts with the weight values applied, thereby updating the pass judgment characteristic information.

The weight values can be assigned in any manner such that the total of the weight values is equal to "one." For example, the largest value can be assigned to the weight value α1 of the preceding judgment target A-1, and gradually smaller values can be assigned to weight values of older judgment targets. With this configuration, the pass judgment characteristic information can be updated to significantly reflect the characteristic amount of the preceding judgment target, that is, the latest environmental change, and the transition of the past environmental changes can be reflected in the pass judgment characteristic information.

It should be noted that the processing of updating the pass judgment characteristic information may be performed each time pass judgment is made, or may be performed when a predetermined number of pass judgments are made successively. In other words, any frequency of updating processing can be set as long as environmental changes are followed, and the processing of updating the pass judgment characteristic information is performed in response to pass judgment.

Embodiment 1 has been described so far with the example of the appearance test of articles in which the pass/fail judgment is performed by using the images of the articles as the monitoring data. Alternatively, the monitoring data of the article can be provided from audio data or sensor values measured by a sensor device. For example, the judgment apparatus 100 can be configured to use audio data collected in a non-destructive test with an acoustic method as monitoring data and to judge the state inside the article as pass or fail (such as the presence or absence of cracks). In this case, the pass judgment characteristic information can be produced, for example, based on the wavelength ranges of sounds collected from judgment targets judged as pass.

When the sensor value is used as the monitoring data, for example, a distance sensor collects the height value of the sectional shape of the article and the judgment apparatus 100 can be configured to judge the state of the surface shape of the article as pass or fail. In this case, the pass judgment characteristic information can be produced, for example, based on the sensor values collected from judgment targets judged as pass.

In addition, the judgment apparatus 100 can be configured to use 3D image data (stereoscopic image data) such as 3D ultrasonic image data as the monitoring data. In this case, a 3D ultrasonic image acquiring apparatus (3D echo (3D ultrasonic) test apparatus) can be used as the monitoring apparatus K. The pass judgment characteristic information can be produced based on the 3D image data collected from judgment targets judged as pass.

While the aspect has been described in which the different multiple judgment targets sequentially undergo the pass/fail judgment processing in chronological order, the judgment target may be an article manufactured in a sequential flow (elongated member such as steel including rolled steel, H-shaped steel, and I-shaped steel, and rod-shaped rebar), for example. In this case, the images of segments of the judgment target are taken sequentially and separately along the longitudinal direction. The judgment apparatus 100 can be configured to receive input of the sequential image data items taken separately as the monitoring data and to judge the elongated article as pass or fail in each of the segments along the longitudinal direction.

The judgment apparatus 100 and the judgment reference production apparatus 200 may be composed of a single apparatus. The judgment apparatus 100 can also be constituted in the form of cloud-type service offering. Specifically, the monitoring data output from the monitoring apparatus K (for example, image data) can be transmitted to the judgment apparatus 100 over the IP network. This allows the configuration in which the pass/fail judgment processing is performed on the cloud side and the result of pass/fail judgment is transmitted to the display apparatus D, a monitoring terminal, a monitoring device, and other equipment over the IP network. Alternatively, both the judgment apparatus 100 and the judgment reference production apparatus 200 may be constituted in the form of cloud-type service offering.

The judgment apparatus 100 and the judgment reference production apparatus 200 are computer apparatuses each having a computing function, a storage function, a communication function and other functions such as a server apparatus. They may include, as a hardware configuration, a memory (main storage apparatus), operation input means such a mouse, a keyboard, and a touch panel, output means such as a printer, and an auxiliary storage apparatus (including a hard disk).

The functions of the present invention can be implemented by a program. A computer program previously provided for implementing the functions can be stored on an auxiliary storage apparatus, the program stored on the auxiliary storage apparatus can be read by a control section such as a CPU to a main storage apparatus, and the program read to the main storage apparatus can be executed by the control section to cause the computer to perform the functions of the respective components of the present invention. The functions of the apparatus 100 can also be provided by separate apparatuses, and those apparatuses can be interconnected directly or via a network to constitute a computer system.

The program may be recorded on a computer readable recording medium and provided for the computer. Examples of the computer readable recording medium include optical disks such as CD-ROMs, phase-change optical disks such as DVD-ROMs, magneto-optical disks such as Magnet-Optical (MO) disks and Mini Disks (MD), magnetic disks such as Floppy Disks® and removable hard disks, and memory cards such as compact Flash® memory cards, smart media, SD memory cards, and memory sticks. Hardware apparatuses such as an integrated circuit (such as an IC chip) designed and configured specifically for the purpose of the present invention are included in the recording medium.

While the exemplary embodiment of the present invention has been described above, the embodiment is only illustrative and is not intended to limit the scope of the present invention. The novel embodiment can be implemented in various other forms, and various omissions, substitutions, and modifications can be made thereto without departing from the spirit or scope of the present invention. These embodiments and variations are encompassed within the spirit or scope of the present invention and within the invention set forth in the claims and the equivalents thereof.

DESCRIPTION OF THE REFERENCE NUMERALS

100 JUDGMENT APPARATUS
110 JUDGMENT SECTION
120 REFERENCE CONTROL SECTION
130 STORAGE SECTION
200 JUDGMENT REFERENCE PRODUCTION APPARATUS

210 JUDGMENT CHARACTERISTIC INFORMATION PRODUCTION SECTION
220 STORAGE SECTION
A JUDGMENT TARGET
D DISPLAY APPARATUS
H CONVEYOR APPARATUS
K MONITORING APPARATUS

The invention claimed is:

1. A judgment apparatus for judging a judgment target as pass or fail using a monitoring data item of the judgment target, comprising:

a memory configured to store pass judgment characteristic information produced using characteristic amounts extracted from previously collected monitoring data items of judgment targets judged as pass, the pass judgment characteristic information being centered on an average value of the characteristic amounts extracted from the monitoring data items of the judgment targets judged as pass; and a processor configured to:

extract the characteristic amounts from monitoring data items of judgment targets sequentially input and successively perform pass/fail judgment of the judgment targets based on the pass judgment characteristic information; and when one of the judgment targets is judged as pass in the successive pass/fail judgment, add the characteristic amounts of multiple judgment targets judged as pass before the judgment target judged as good to the pass judgment characteristic information used in the judgment as pass and to average the resulting value to update the pass judgment characteristic information, perform pass/fail judgment of a judgment target subsequent to the judgment target judged as pass based on the updated pass judgment characteristic information with the average value shifted by the characteristic amounts of the multiple judgment targets previously judged as pass, and apply weight values to the characteristic amounts of the multiple judgment targets judged as good before the judgment target judged as good and add and average the characteristic amounts with the weight values applied thereto to update the pass judgment characteristic information.

2. The judgment apparatus according to claim 1, wherein the processor is configured to, when one of the judgment targets is judged as pass in the successive pass/fail judgment, add the characteristic amount of the judgment target judged as pass to the average value of the pass judgment characteristic information used in the judgment as pass and to average the resulting value to update the pass judgment characteristic information, and the processor is configured to perform pass/fail judgment of a next judgment target based on the updated pass judgment characteristic information with the average value shifted by the characteristic amount of the preceding judgment target judged as pass.

3. The judgment apparatus according to claim 1, wherein the monitoring data item is an image data item provided by an imaging apparatus configured to take images of the judgment targets, the characteristic amount is a luminance value at each pixel position in the image data, the pass judgment characteristic information is information centered on an average luminance value of the luminance values at each pixel position in the image data items of the judgment targets judged as pass, and the processor is configured to add a luminance value at each pixel position extracted from one of the judgment targets judged as pass in the successive pass/fail judgment to the average luminance value at each pixel position of the pass judgment characteristic information applied to the pass/fail judgment and to average the resulting value to update the pass judgment characteristic information.

4. The judgment apparatus according to claim 1, wherein the pass judgment characteristic information includes first pass judgment characteristic information for determining the presence or absence of abnormality in any one of the judgment targets and second pass judgment characteristic information for determining whether the abnormality falls within a predetermined acceptable range, the processor is configured to perform pass/fail judgment processing including first judgment processing of determining the presence or absence of abnormality in any one of the judgment targets based on the first pass judgment characteristic information and second judgment processing of determining whether the abnormality falls within the predetermined acceptable range based on the second pass judgment characteristic information when it is determined that there is any abnormality, and the processor is configured to, when one of the judgment targets is judged as pass in the successive pass/fail judgment, use the characteristic amount of the judgment target judged as pass to update the first pass judgment characteristic information.

5. A program stored on a non-transitory computer-readable medium and comprising instructions executable by a computer apparatus configured to judge a judgment target as pass or fail using a monitoring data item of the judgment target, wherein the instructions, when executed by the computer apparatus, cause the computer apparatus to provide functions including:

storing pass judgment characteristic information produced using characteristic amounts extracted from previously collected monitoring data items of judgment targets judged as pass, the pass judgment characteristic information being centered on an average value of the characteristic amounts extracted from the monitoring data items of the judgment targets judged as pass, extracting the characteristic amounts from monitoring data items of judgment targets sequentially input and to successively perform pass/fail judgment of the judgment targets based on the pass judgment characteristic information; and when one of the judgment targets is judged as pass in the successive pass/fail judgment, adding the characteristic amounts of multiple judgment targets judged as pass before the judgment target judged as good to the pass judgment characteristic information used in the judgment as pass and averaging the resulting value to update the pass judgment characteristic information, performing pass/fail judgment of a judgment target subsequent to the judgment target judged as pass based on the updated pass judgment characteristic information with the average value shifted by the characteristic amounts of the multiple judgment targets previously judged as pass, and applying weight values to the characteristic amounts of the multiple judgment targets judged as good before the judgment target judged as good and adding and average the characteristic amounts with the weight values applied thereto to update the pass judgment characteristic information.

6. A judgment system for judging a judgment target as pass or fail using a monitoring data item of the judgment target, comprising:

at least one processor configured to extract characteristic amounts from previously collected monitoring data items of judgment targets judged as pass and to produce pass judgment characteristic information using the extracted characteristic amounts, the pass judgment characteristic information being centered on an average value of the characteristic amounts extracted from the monitoring data items of the judgment targets judged as pass;

a memory configured to store the pass judgment characteristic information;

wherein the at least one processor is configured to:

extract the characteristic amounts from monitoring data items sequentially input and to successively perform pass/fail judgment of judgment targets based on the pass judgment characteristic information; and when one of the judgment targets is judged as pass in the successive pass/fail judgment, add the characteristic amounts of multiple judgment targets judged as pass before the judgment target judged as good to the pass judgment characteristic information used in the judgment as pass and to average the resulting value to update the pass judgment characteristic information, perform pass/fail judgment of a judgment target subsequent to the judgment target judged as pass based on the updated pass judgment characteristic information with the average value shifted by the characteristic amounts of the multiple judgment targets previously judged as pass, and apply weight values to the characteristic amounts of the multiple judgment targets judged as good before the judgment target judged as good and add and average the characteristic amounts with the weight values applied thereto to update the pass judgment characteristic information.

* * * * *